United States Patent Office 3,036,062
Patented May 22, 1962

3,036,062
PROCESS FOR THE PREPARATION OF
ORGANIC COMPOUNDS
Harold Belding MacPhillamy, Madison, and Robert Armistead Lucas, Mendham, N.J., assignors to Ciba Corporation, a corporation of Delaware
No Drawing. Filed Aug. 5, 1959, Ser. No. 831,727
8 Claims. (Cl. 260—210.5)

This invention concerns a process for the preparation of glycosides. More particularly, it relates to a process for the preparation of 3-glycosides of $\Delta^5$-20α-amino-3β-hydroxy-pregnene of the formula:

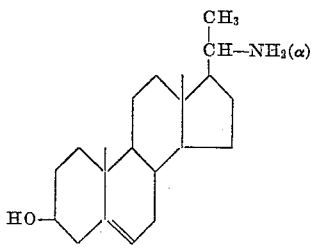

and the salts thereof.

The $\Delta^5$-20α-amino-3β-hydroxy-pregnene 3-β-D-glucoside, known as conopharyngine, is an alkaloidal substance, isolated from Conopharyngia species, particularly from Conopharyngia pachisyphon, which exhibits a strong hypotensive activity and can be used as a hypotensive agent in pharmacological research, as well as in treatment of hypertensive conditions. It is prepared from plant, particularly root, material according to the process described in patent application Serial No. 724,877, filed March 31, 1958, now abandoned, by Robert Armistead Lucas and Daniel Frederick Dickel, i.e. by treating plant material of a Conopharyngia species or a lower alkanol extract thereof with a solvent mixture comprising at least one sparingly water-miscible solvent selected from the group comprising hydrocarbons, halogenated lower aliphatic hydrocarbons and lower alkanols and at least one water-miscible solvent selected from the group comprising lower alkanols, lower alkanoic acids, aqueous mixtures thereof and water, treating the extract, resulting from the fraction comprising the water-miscible solvent and containing a salt of conopharyngine, with a basic reagent, and isolating and crystallizing conopharyngine, and, if desired, converting the resulting conopharyngine into a salt thereof. This process for manufacturing the desired compound depends, therefore, on the supply of plant material, which is in addition subject to varying contents of the alkaloidal substance.

We have now found that conopharyngine can be prepared synthetically by introducing the β-D-glucose residue into the $\Delta^5$-20α-amino-3β-hydroxy-pregnene. This process is carried out by reacting $\Delta^5$-20α-amino-3β-hydroxy-pregnene, in which the amino group is temporarily protected, with a D-halogeno-glucose, the hydroxyl groups of which are temporarily protected, in the presence of a basic condensation reagent and, if necessary, converting temporarily protected amino and/or hydroxyl groups into free amino and/or hydroxyl groups, respectively, and/or, if desired, converting a resulting salt into the base, and/or, if desired, converting a resulting base into a salt thereof.

A temporarily protected amino group is particularly an acylamino group, in which the acyl radical is preferably derived from a strong aliphatic acid, such as a halogen substituted acetic acid, e.g. trifluoroacetic acid or trichloroacetic acid. A temporarily protected amino group may also be a benzyl-substituted amino group, e.g. dibenzylamino.

A D-halogeno-glucose, the hydroxyl groups of which are temporarily protected, and which is capable of forming a β-glucoside linkage with the hydroxyl group at the 3-position of the $\Delta^5$-20α-amino-3β-hydroxy-pregnene, are D-1-halogeno-glucoses, in which halogen stands for chlorine, or particularly bromine, and in which the free hydroxyl groups are temporarily protected, for example, by acyl radicals derived from strong organic carboxylic acids, such as lower aliphatic carboxylic acids, for example, lower alkanoic acids, e.g. acetic acid. A reagent of choice is, for example, D-1-bromo-tetra-O-acetyl-glucose (acetobromglucose).

The reaction is carried out according to the conditions known for the preparation of β-glucosides, for example, in the presence of a basic condensation reagent, particularly an anhydrous alkaline reagent, such as silver oxide or silver carbonate, or an anhydrous organic tertiary base, e.g. pyridine. Suitable solvents are inert organic solvents which are selected according to the solubilities of the reagents; halogenated aliphatic hydrocarbons, e.g. methylene chloride or chloroform, or aromatic hydrocarbons, e.g. benzene or toluene, may be utilized. Silver oxide and silver carbonate are advantageously used in the presence of a dehydrating agent, such as calcium sulfate, and/or while azeotropically distilling part of the solvent, particularly an aromatic hydrocarbon e.g. benzene, to remove any trace of water. The reaction is preferably performed at room temperature and, if desired, in the atmosphere of an inert gas, e.g. nitrogen.

The starting materials used in the above reaction are known; they may be prepared, for example, by reacting $\Delta^5$-20α-amino-3β-hydroxy-pregnene with trifluoroacetic acid anhydride in the presence of pyridine, and hydrolizing any 3-β-trifluoroacetoxy group present in the resulting product by treatment with an alkali metal, e.g. sodium or potassium, hydrogen carbonate.

The $\Delta^5$-20α-amino-3β-hydroxy-pregnene 3-β-D-glucoside may also be obtained by replacing in $\Delta^5$-3β-hydroxy-20-oxo-pregnene 3-β-D-glucoside, in which the free hydroxyl groups may be temporarily protected, the oxo group by an α-amino group, and, if necessary, converting temporarily protected hydroxyl groups into free hydroxyl groups, and, if desired, carrying out the optional steps.

The conversion of an oxo-group into an α-amino group may be carried out according to conventional methods. For example, upon treatment with a mineral acid addition salt, e.g. sulfate or hydrochloride, of hydroxylamine in the presence of a base, such as an alkali metal lower alkanoate, e.g. sodium or potassium acetate or a tertiary amine, such as, for example, a liquid heterocyclic tertiary base, e.g. pyridine, the oxo-group may be converted to an oximino group. In this conversion, the liquid base, particularly pyridine, or another additional diluent, such as a lower alkanol, e.g. methanol or ethanol, may serve as a solvent. The oximino compound or a salt thereof may then be reduced to the α-amino compound with an acidic reducing reagent and/or in the presence of an acidic medium. For example, upon treatment with hydrogen in the presence of a catalyst containing a metal of the eighth group of the periodic system, e.g. platinum oxide, and in the presence of an acid, such as a lower alkanoic acid, e.g. acetic acid, or upon treatment of an acid, e.g. acetic acid, solution of the oxime with zinc, the oximino group may be converted to the α-amino group. The double bond present in the 5-position of the starting material may be reduced simultaneously with the oximino group, particularly if catalytically activated hydrogen is used as the reducing reagent. If desired, such double bond may be protected, for example, by adding halogen, e.g. bromine, to the double bond prior to the hydrogenation step and debrominating after completion of the reduction, which may be carried out, for example, by treatment with zinc in acetic acid or chromous chloride in acetone.

A modification of the above-mentioned preparation of the desired $\Delta^5$-3$\alpha$-amino-3$\beta$-hydroxy-pregnene 3-$\beta$-D-glucoside composes converting in a $\Delta^5$-20$\alpha$-carboxy 3$\beta$-hydroxy-pregnene 3-$\beta$-D-glucoside, in which the hydroxyl groups may be temporarily protected, the carboxyl group into an $\alpha$-amino group, and, if necessary, converting the temporarily protected hydroxyl groups into free hydroxyl groups, and, if desired, carrying out the optional steps.

This conversion may be carried out, for example, according to the Curtius procedure, which involves conversion of the carboxyl group into the carboxy chloride group, for example, by treatment with oxalyl chloride, reacting the resulting acid chloride with an amide, such as an alkali metal, e.g. sodium, azide, and rearranging the acid azide compound to the desired 20$\alpha$-amino derivative by treatment with a lower alkanol, e.g. ethanol, and then with an acidic or an alkaline reagent; these reactions may be carried out according to known conditions.

The starting materials used in the above procedures may be prepared, for example, by glucosylating the hydroxyl group in 3-position according to the previously-described procedure.

The above-mentioned procedures for the preparation of $\Delta^5$-20$\alpha$-amino-3$\beta$-hydroxy-pregnene 3-$\alpha$-D-glucoside may also be employed for the preparation of new $\Delta^5$-20-amino-3-hydroxy-pregnene 3-glycosides or salts thereof. Said pregnene compounds may also be of the 19-nor-type, i.e. the methyl group in the 10-position may be replaced by hydrogen, and/or the carbon atom in the 21-position may contain a free or an esterified hydroxyl group. Furthermore, the hydroxyl group in the 3-position, as well as the amino group in the 20-position may have the $\alpha$- or the $\beta$-configuration. Thus, a $\Delta^5$-20-amino-3-hydroxy-pregnene, in which the amino group is temporarily protected, may be treated with a halogeno-monosaccharide or a halogeno-disaccharide, in which the hydroxyl groups are temporarily protected, and, if necessary, temporarily protected amino and/or hydroxyl groups may be converted into free amino and/or hydroxyl groups, and, if desired, the optional steps may be carried out.

Temporarily protected amino groups are, as has been previously described, primarily lower alkanoylamino groups, in which the lower alkanoyl group represents the acyl radical of a strong lower alkanoic acid, such as trifluoroacetic acid.

In addition to the D-halogeno-glucoses above, other halogeno-monosaccharides or halogenodisaccharides, in which the hydroxyl groups are temporarily protected, may be used as glycosylating reagents. Such reagents are, for example, 1-bromo-monosaccharides or 1-bromo-disaccharides, in which the hydroxyl groups are acylated by lower alkanoic acids, especially acetic acid; such reagents are, for example, 1-bromo-tri-O-acetyl-aldopentoses, e.g. 1-bromo-tri-O-acetyl-arabinose, 1-bromo-tri-O-acetyl-xylose or 1-bromo-tri-O-acetyl-ribose and the like, 1-bromo-tri-O-acetyl-deoxy-aldohexoses, e.g. 1-bromo-tri-O-acetyl-rhamnose and the like, 1-bromo-tetra-O-acetyl-aldohexoses, e.g. 1-bromo-tetra-O-acetyl-galactose, 1-bromo-tetra-O-acetyl-mannose, 1-bromo-tetra-O-acetyl-allose, 1-bromo-tetra-O-acetyl-altrose or 1-bromo-tetra-O-acetyl-gulose and the like in addition to the 1-bromo-tetra-O-acetyl-glucose, or 1-bromo-hepta-O-acetyl-hexosido-aldohexoses, e.g. 1-bromo-hepta-O-acetyl-maltose or 1-bromo-hepta-O-acetyl-lactose and the like or the corresponding chlorine analogs. These reagents may have the D- or the L- configuration.

The reaction may be carried out according to the previously given procedure. Thus, in the presence of an alkaline reagent the $\Delta^5$-20-amino-3-hydroxy-pregnene, in which the amino group is temporarily protected, when reacted with the glycosylating reagent, yields predominantly the $\Delta^5$-20-amino-3-hydroxy-pregnene 3-$\beta$-glycoside. On the other hand, if the reaction is carried out in the presence of a more acidic reagent, such as, for example, mercuric acetate or ferric chloride, the corresponding $\Delta^5$-20-amino-3-hydroxy-pregnene 3-$\alpha$-glycosides may be formed as the major products. The configuration of the glycoside portion in the final products may also depend on other reaction conditions, such as the ratio of reagent to the catalyst, solvents and/or reaction temperature.

Solvents are, for example, halogenated hydrocarbons, e.g. methylene chloride or chloroform, or aromatic hydrocarbons, e.g. benzene or toluene. If necessary, dehydrating reagents, such as calcium sulfate and/or means to remove generated water may be used; the reaction temperature may be elevated.

The $\Delta^5$-20-amino-3-hydroxy-pregnenes, in which the amino group is temporarily protected, and which are used as the starting materials, are known or may be prepared according to procedures used for the preparation of known analogs. The $\Delta^5$-20$\beta$-amino-3-hydroxy-pregnene may be obtained as the predominant product by reducing the previously described $\Delta^5$-3-hydroxy-20-oximino-pregnene under alkaline conditions, for example, by treatment of a lower alkanol, e.g. methanol, ethanol, propanol or n-butanol, solution of the starting material with an alkali metal, e.g. sodium, or by treatment of the starting material with an alkali metal aluminum hydride, e.g. lithium aluminum hydride, in an inert solvent, e.g. ether. The free amino group in the 20-position is then temporarily protected, by acylation, for example, with trifluoroacetic acid.

The new 3-glycosides of $\Delta^5$-20-amino-3-hydroxy-pregnenes may also be prepared by converting in $\Delta^5$-3-hydroxy-20-oximino-pregnene 3-glycosides or in $\Delta^5$-20$\alpha$-carboxyl-3-hydroxyl-pregnene 3-glycosides, in which the hydroxyl groups of the glycosyl residue may be temporarily protected, the oxo group or the carboxyl group, respectively, into an amino group, and, if necessary, converting temporarily protected hydroxyl groups into free hydroxyl groups, and, if desired, carrying out the optional steps. The above-described conversions are carried out as previously shown. Whereas the carboxyl group, by virtue of its $\alpha$-configuration, yields upon its conversion the 20$\alpha$-amino group only, the reduction of the oximino may be directed in such way that the amino group of the final product has the $\alpha$-configuration (reduction with an acidic reagent and/or in acidic medium) or the $\beta$-configuration (reduction with an alkaline reagent and/or under alkaline conditions).

The starting materials used in the above-mentioned procedure are known or, if new, may be prepared according to procedures used for the preparation of the known analogs. Thus, the 3-hydroxyl group in $\Delta^5$-3-hydroxy-20-oxo-pregnene or in $\Delta^5$-3-hydroxy-20-oximino pregnene may be glycosylated according to previously described procedures and, if necessary, the oxo group may then be transformed into the oximino group. Or, a $\Delta^5$-20$\alpha$-carboxyl-3-hydroxy-pregnene may be glycosylated into the desired $\Delta5$-20$\alpha$-carboxyl-3-hydroxy-pregnene 3-glycoside.

Any functionally converted amino and/or hydroxyl groups present after the formation of the glycoside bond or the amino group, respectively, are converted into the free amino and/or hydroxyl groups. Acylamino groups, particularly halogeno-lower alkanoyl-amino, e.g. trifluoroacetamino or trichloroacetamino, groups are hydrolized, for example, by treatment with an alkaline reagent, such as aqueous alkali metal hydroxide, e.g. lithium, sodium or potassium hydroxide. An aqueous acid reagent, such as dilute hydrohalic acid, e.g. hydrochloric acid, may also be used; however, acid reagents may split the glycoside bond. An acyloxy, such as a lower alkanoyloxy, e.g. acetoxy, group, as it is present in the glucoside portion, is also hydrolyzed with an alkaline reagent, such as, for example, aqueous alkali metal hydroxide, e.g. lithium, sodium or potassium hydroxide. Acylamino and acyloxy groups present in the reaction product may, therefore, be hydrolyzed simultaneously.

A benzyl radical, as present for example in a dibenzyl-amino group may be removed by hydrogenation under mild conditions, for example, by treatment with hydrogen under atmospheric pressure and in the presence of a catalyst, such as a catalyst containing a metal of the eighth group of the periodic system, e.g. palladium black.

Depending on the conditions used, the 3-glycosides of the $\Delta^5$-20-amino-3$\beta$-hydroxy-pregnenes are obtained in the form of free bases or in the form of salts thereof. A salt may be converted into the free base in the customary way, for example, by treatment with an aqueous alkaline reagent, such as an alkali metal hydroxide, e.g. lithium, sodium or potassium hydroxide, alkali metal carbonate, e.g. sodium or potassium carbonate or hydrogen carbonate, or ammonia. The free base may be transformed into its therapeutically useful acid addition salts by reaction with inorganic acids, such as mineral acids, e.g. hydrochloric, hydrobromic, sulfuric or phosphoric acids, or with organic acids, such as acetic, propionic, tartaric, citric, maleic acids, etc., for example, by treating a solution of the base in a lower alkanol, e.g. methanol or ethanol in an aqueous mixture thereof with the acid or a solution thereof.

The glycosides of the formula

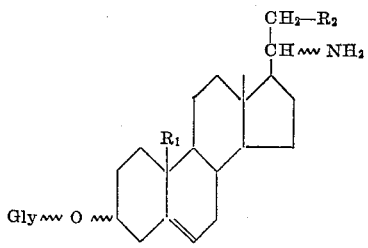

in which $R_1$ represents hydrogen or methyl, $R_2$ stands for hydrogen, hydroxyl or esterified hydroxyl, and Gly represents the glycosyl residue of monosaccharides and disaccharides, and in which the amino group in 20-position, as well as the hydroxyl group in 3-position may have the $\alpha$-configuration or the $\beta$-configuration, with the proviso that Gly represents the $\alpha$-D-glucosyl residue whenever $R_1$ stands for methyl, $R_2$ for hydrogen, the amino group in 20-position has the $\alpha$-configuration and the oxido group in 3-position has the $\beta$-configuration, and salts of these compounds, which are prepared according to the previously described procedure, are new and are intended to be included within the scope of this invention.

In the above formulae $R_1$ represents primarily methyl; $R_2$ apart from being hydrogen or hydroxyl may stand for a hydroxyl group esterified by organic carboxylic acids containing from one to twelve carbon atoms. Such acids may be represented by aliphatic carboxylic acids, such as alkanoic acids, e.g. formic, acetic, propionic, n-butylric, n-valeric, n-hexanoic, n-decanoic, lauric, trimethylacetic. isobutyric, isovaleric or tertriary butyl-acetic acid, alkenoic acids, e.g. acrylic, crotonic or undecylenic acid, alkylonic acids, e.g. propiolic, 2-butyonic or undecolic acid, cycloalkanoic acids, e.g. cyclohexane-carboxylic acid, cycloalkyl-lower-alkanoic acids, e.g. cyclohexylacetic acid or $\beta$-cyclopentyl-propionic acid, aliphatic dicarboxylic acids (the free carboxyl group of which may then be converted into water-soluble alkali metal, e.g. sodium, salts), such as saturated aliphatic dicarboxylic acids, e.g. succinic or adipic acid, or unsaturated aliphatic dicarboxylic acids, e.g. maleic or citraconic acids, carbocyclic aryl carboxylic acids, e.g. benzoic acid, carbocyclic aryl-alkanoic acids, e.g. phenylacetic or $\beta$-phenyl-propionic acid, or carbocyclic aryl-alkenoic acids, e.g. cinnamic acid. Gly represents more specifically the glycosyl residue of a monosaccharide, such as, for example, an aldopentose, e.g. arabinose, xylose or ribose and the like, a deoxy-aldohexose, e.g. rhamnose and the like, or an aldohexose, e.g. glycose, galactose, mannose, allose, altrose or gulose and the like, or of a disaccharide, e.g. maltose or lactose and the like. These residues may be in the L-form, or preferably in the D-form. Salts are therapeutically accpetable acid addition salts, particularly those with mineral acids, e.g. hydrochloric, hydrobromic, sulfuric or phosphoric acid and the like, or with aliphatic carboxylic acids, e.g. acetic, propionic, tartaric, citric or maleic and the like.

The new compounds and the salts thereof exhibit antihypertensive effects and can be used as antihypertensive agents in pharmacological research, as well as in treatment of hypertensive conditions, such as renal hypertension and the like.

The new compounds of this invention may be used as medicaments in the form of pharmaceutical preparations, which contain the new glycosides or the salts thereof in admixture with a pharmaceutical organic or inorganic, solid or liquid carrier. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in the solid form, for example, as capsules, tablets or dragees, or in liquid form, for example, as solutions, e.g. isotonic saline solutions, or as suspensions or emulsions. If desired, they may contain auxiliary substances such as preserving agents, stabilizing agents, wetting or emulsifying agents, salts for varying the osmotic pressure or buffers. They may also contain, in combination, other therapeutically useful substances, for example, other antihypertensive compounds, such as rauwolfia alkaloids, e.g. reserpine, rescinnamine or deserpidine, synthetic deserpidines, e.g. syrosingopine, veratrum alkaloids, e.g. germine or protoveratrine, synthetic hypotensive compounds, e.g. hydralazine or dihydralazine, or ganglionic blockers, e.g. chlorisondamine.

This application is a continuation-in-part of our application Serial No. 757,118, filed August 25, 1958, now abandoned.

The following examples illustrate the invention and are not to be considered as being limitations thereon. Temperatures are given in degrees centigrade.

*Example 1*

To a solution of 2.96 g. of $\Delta^5$-3$\beta$-hydroxy-20$\alpha$-trifluoroacetylamine-pregnene in 50 ml. of dry chloroform are added 5.92 g. of acetobromglucose, 5.92 g. of freshly prepared silver oxide and 5.92 g. of pulverized calcium sulfate. The mixture is stirred at room temperature for 24 hours and the insoluble material then removed by filtration. Evaporation of the solvent from the resulting filtrate yields 8.3 g. of a colorless glass which does not crystallize. A benzene solution of 5.5 g. of this material is chromatographed on 150 g. of aluminum oxide (Woelm, neutral). The fractions eluted with a 20:80-mixture of acetone and benzene yields 3.45 g. of the $\Delta^5$-3$\beta$-hydroxy-20$\beta$-trifluoroacetylamine-pregnene 3-$\beta$-D-tetra-O-acetyl-glucoside, which is recrystallized from a mixture of ethyl acetate and hexane, M.P. 200–205°.

A mixture of 3.0 g. of the crystalline $\Delta^5$-3$\beta$-hydroxy-20$\alpha$-trifluoroacetylamine-pregnene 3-$\beta$-D-tetra-O-acetyl-glucoside, in 100 ml. of 95% ethanol and 15 ml. of a 10% aqueous sodium hydroxide solution is refluxed for three hours. On cooling, 0.65 g. of crystalline material separates. An additional 0.42 g. is obtained on concentration of the mother liquor for a total of 1.07 g., M.P. 278–280°, which is further purified by refluxing with a large volume of methanol, filtering hot and concentrating the filtrate to a small volume. The resulting $\Delta^5$-20$\alpha$-amino-3$\beta$-hydroxy-pregnene 3-$\beta$-D-glucoside melts at 285–287° and, as the comparison of the infrared absorption spectra demonstrates, is identical with the conopharyngine obtained from natural sources according to the procedure described in copending U.S. application Serial No. 724,877, filed on March 31, 1958, by Robert Armistead Lucas and Daniel Frederick Dickel.

To a suspension of 0.12 g. of $\Delta^5$-20α-amino-3β-hydroxy-pregnene 3-β-D-glucoside in 50 ml. of 95% ethanol are added 4 drops of aqueous hydrochloric acid (1:1). On warming gently part of the material goes into solution and after filtration the ethanol solution is concentrated and the crystalline hydrochloride of $\Delta^5$-20α-amino-3β-hydroxy-pregnene 3-β-D-glucoside separates, M.P. 257–259°. This material is shown to be identical with the conopharyngine hydrochloride by a comparison of their infrared spectra.

The starting material in the above reaction may be prepared as follows: A solution of 7.0 g. of $\Delta^5$-3β-acetoxy-20α-amino-pregnene, prepared according to the procedures of Julian et al., J. Am. Chem. Soc., vol. 70, p. 888 (1948), in 100 ml. of a 2% methanol solution of potassium hydroxide is refluxed for two hours. The reaction mixture is poured into an excess of water and the aqueous solution extracted with ether. The ether solution is washed with water, dried over sodium sulfate and the solvent is removed, leaving 5.7 g. of $\Delta^5$-20α-amino-3β-hydroxy-pregnene which, after recrystallization from ethyl acetate, melts at 172–174°; $[\alpha]_D^{25°} = -69.2°$ (in chloroform).

To a suspension of 3.56 g. of $\Delta^5$-20α-amino-3β-hydroxy-pregnene in 26 ml. of dry pyridine is added portionwise 8.37 g. of trifluoroacetic anhydride. A gum is formed, which dissolves and the reaction mixture is allowed to stand for two hours at room temperature. It is then poured into ice and water and the aqueous solution is extracted with ether. The ether layer is washed with water, then dried over sodium sulfate, and the solvent is removed. 5.75 g. of a yellow solid material remains which consists of a mixture of mono- and diacylated material. This mixture is partially saponified by dissolving it in 200 ml. of warm ethanol, cooling to room temperature and adding 7.3 g. of potassium bicarbonate in 100 ml. of water. The resulting suspension is allowed to stand at room temperature for twenty-four hours and then diluted with an excess of water. The precipitate is extracted with chloroform and the organic phase is washed with water and dried. Removal of the solvent under reduced pressure yield 3.46 g. of $\Delta^5$-3β-hydroxy-20α-trifluoroacetylamino-pregnene, which is recrystallized from methanol, M.P. 199–201°.

Instead of reacting $\Delta^5$-3β-hydroxy-20α-trifluoroacetylamino-pregnene with acetobromglucose, this starting material or the corresponding trichloroacetyl analog thereof may be reacted with another mono- or disaccharide derivative, such as, for example, acetobromribose, acetobromgalactose, acetobromlactose or acetobrommaltose and the like, according to the conditions set forth in the example. Acylated amino and hydroxyl groups in the resulting products are hydrolyzed according to the procedure of the example to yield the corresponding $\Delta^5$-20α-amino-3β-hydroxy-pregnene 3-glycosides, such as, for example, the riboside, galactoside, lactoside or maltoside and the like.

*Example 2*

A mixture of 3.57 g. of $\Delta^5$-3β-hydroxy-20β-trifluoroacetylamino-pregnene, 7.14 g. of acetobromglucose, 7.0 g. of silver oxide and 7.0 g. of calcium sulfate in 150 ml. of chloroform is stirred at room temperature for 24 hours. The solid material is filtered off, the solvent removed from the filtrate and a benzene solution of a portion of the non-crystalline residue is chromatographed on alumina. The benzene eluate crystallizes and the $\Delta^5$-3β-hydroxy-20β-trifluoroacetylamino-pregnene 3-β-D-tetra-O-acetyl-glucoside is recrystallized from a mixture of ethyl acetate and hexane, M.P. 205–206°.

To a solution of 2.78 g. of the non-crystalline portion of $\Delta^5$-3β-hydroxy-20β-trifluoroacetylamino-pregnene 3-β-D-tetra-O-acetyl-glucoside in 100 ml. of ethanol is added 15 ml. of a 10 percent aqueous sodium hydroxide solution, and the mixture is refluxed for three hours. On cooling, 0.6 g. of the crystalline $\Delta^5$-20β-amino-3β-hydroxy-pregnene 3-β-D-glucoside is formed, filtered off and washed with hot ethanol, M.P. 293–297°.

0.45 g. of the above free base is suspended in 300 ml. of ethanol and aqueous hydrochloric acid (1:1) is added until the solution reacts acidic. It is then warmed on the steam bath, filtered hot and concentrated under reduced pressure until the desired $\Delta^5$-20β-amino-3β-hydroxy-pregnene 3-β-D-glucoside hydrochloride crystallizes. It is recrystallized from aqueous methanol, M.P. 258–259°; yield: 0.35 g.

The starting material in the above reaction may be prepared as follows: To a refluxing solution of 11.39 g. of the oxime of $\Delta^5$-3β-acetoxy-20-oxo-pregnene in 800 ml. of dry n-propanol is added 18 g. of sodium in small pieces over a period of three hours. About 300 ml. of the solvent is removed under reduced pressure and approximately 1000 ml. of water is added. The aqueous solution is extracted with ethyl acetate, the organic layer is washed with water, dried over sodium sulfate and then filtered. An ether solution of hydrogen chloride is added and 5.3 g. of the $\Delta^5$-20β-amino-3β-hydroxy-pregnene hydrochloride is obtained.

The salt is dissolved in warm ethanol by adding a small volume of water, and 10 percent aqueous sodium hydroxide is added to pH 8 to 9. On dilution with water the $\Delta^5$-20β-amino-3β-hydroxy-pregnene precipitates, is filtered off and dried. After recrystallization from methanol and from ethyl acetate it melts at 173–174°; yield: 4.2 g.

To a suspension of $\Delta^5$-20β-amino-3β-hydroxy-pregnene in 40 ml. of dry pyridine is added 13 g. of trifluoroacetic acid anhydride in portions while shaking. The mixture is allowed to stand at room temperature for two hours. The excess of the acid anhydride is decomposed by cautiously adding ice-water, and upon addition of a further quantity of water, a precipitate is formed. The latter is extracted with ether, the organic solution is washed with water, dilute aqueous hydrochloric acid and again with water. The organic solvent is removed after drying to leave 5.2 g. of a solid material, which melts above 180° over a wide range, and represents probably a mixture of mono- and bistrifluoro-acetylated $\Delta^5$-20β-amino-3β-hydroxy-pregnene. Upon partial hydrolysis by suspending the mixture in 200 ml. of ethanol (95 percent), adding a solution of 7.0 g. of sodium bicarbonate in 75 ml. of water, allowing to stand for two days at room temperature and diluting with water the $\Delta^5$-3β-hydroxy-20β-trifluoroacetylamino-pregnene precipitates. It is recrystallized from aqueous methanol, M.P. 180–181°.

Instead of using acetobromglucose as the glycosylating reagent other mono- or disaccharide derivatives such as, for example, acetobromribose, acetobromgalactose, acetobromlactose or acetobrommaltose may be used in the reaction with $\Delta^5$-3β-hydroxy-20β-trifluoroacetylamino-pregnene to yield, after hydrolysis of acylated amino and hydroxy groups, additional 3-glycosides of $\Delta^5$-20β-amino-3β-hydroxy-pregnene, such as, for example, the corresponding riboside, galactoside, lactoside or maltoside.

*Example 3*

To a solution of 4.0 g. of $\Delta^5$-21-acetoxy-3β-hydroxy-20-oximino-pregnene (prepared from the corresponding 20-oxo derivative by treatment with hydroxylamine hydrochloride in pyridine) in freshly dried and distilled chloroform are added 11.0 g. of acetobromglucose, 4.2 g. of silver oxide and 3.6 g. of calcium sulfate. The mixture is stirred over three days, filtered through filtercel and then evaporated to dryness. The $\Delta^5$-21-acetoxy-3β-hydroxy-20-oximino-pregnene 3-β-D-tetra-O-acetylglucoside is obtained as a gum and is dissolved in sufficient ethanolic potassium hydroxide to secure a distinctly basic reaction. The solution is refluxed for two hours, then filtered and poured into cold water. The gummy precipitate is filtered off and recrystallized from aqueous methanol to yield 0.62 g. of $\Delta^5$-3$\beta$,21-dihydroxy-20-oximino-pregnene 3-$\beta$-D-glucoside, M.P. 274–276°.

A solution of 0.62 g. of $\Delta^5$-3$\beta$,21-dihydroxy-20-oximino-pregnene 3-$\beta$-D-glucoside in a minimum amount of acetic acid is treated with hydrogen at atmospheric pressure in the presence of 0.3 g. of platinum oxide while gently warming. 58 ml. of hydrogen is taken up within a little over three hours. The catalyst is filtered off, the filtrate is evaporated to dryness and the gummy residue is dissolved in methanol. 10 percent aqueous sodium hydroxide is added until basic reaction, whereupon a white crystalline material precipitates which is filtered off and dissolved in a minimum amount of methanol. Concentrated hydrogen chloride is added to pH=4.5 and the crystalline $\Delta^5$-20$\alpha$-amino-3$\beta$,21-dihydroxy-pregnene 3-$\beta$-D-glucoside hydrochloride is collected and recrystallized from ethanol, M.P. 210–212°; yield: 0.07 g.

*Example 4*

A mixture of 2 g. of $\Delta^5$-3$\beta$-hydroxy-20$\beta$-trifluoroacetylamino-pregnene (dried at 110° for three hours under reduced pressure), 5 g. of crushed anhydrous calcium sulfate and 5 g. of silver oxide in 50 ml. of dry chloroform is stirred for fifteen minutes and 5 g. of acetobromarabinose is added. The reaction mixture is stirred for six days, then filtered, and the filtrate is taken to dryness under reduced pressure. The residue is chromatographed on 100 g. of aluminum oxide (almost neutral, activity grade 1). The eluates with benzene, benzene containing 20 percent methylene chloride, methylene chloride, and methylene chloride containing one percent methanol are collected and separately evaporated to dryness. The solid residues are diluted with aqueous ethanol; the crystalline material obtained from the methylene chloride eluate melts at 110–118°.

0.93 g. of the latter is dissolved in a solution of 1.0 g. of potassium hydroxide in 20 ml. of ethanol and 5 ml. of water; the reaction mixture is allowed to stand at room temperature overnight. A solid material is formed by diluting the solution to 100 ml. with water while warming on the steam bath. The solid material is filtered off and dissolved in 25 ml. of ethanol, which solution is made acidic with hydrochloric acid (1:1). The solid material is filtered off, the filtrate is concentrated to a small volume under a nitrogen atmosphere. A white solid material is filtered off and washed with a mixture of ethanol and ether and with ether to yield the $\Delta^5$-20$\beta$-amino-3$\beta$-hydroxy-pregnene 3-arabinoside, M.P. 232–234°; yield: 0.45 g.

*Example 5*

A mixture of 2 g. of $\Delta^5$-3$\beta$-hydroxy-20$\beta$-trifluoroacetylamino-pregnene, 5 g. of silver oxide and 5 g. of calcium sulfate in 50 ml. of chloroform is stirred for fifteen minutes and 5 g. of acetobromrhamnose is added; stirring is continued for two additional days. The insoluble material is removed by filtration, the filtrate is evaporated under reduced pressure and a mixture of ethanol and water is added to the residue. The supernatent liquid is decanted, and benzene is several times evaporated from the gummy residue. A benzene solution of the resulting foam is chromatographed on 100 g. of aluminum oxide (almost neutral, activity grade 1). Eluates of benzene, a mixture of benzene and methylene chloride (80:20), methylene chloride, methylene chloride containing one percent methanol are collected. Upon adding water portionwise to a cold ethanol solution of the residue from the eluate with methylene chloride containing one percent methanol, a white powder precipitates, is filtered off and washed with water. This represents the $\Delta^5$-3$\beta$-hydroxy-20$\beta$-trifluoroacetylamino-pregnene 3-tri-O-acetyl-rhamnoside, M.P. 109–115°; yield: 1.16 g.

A solution of 1 g. of the above precipitate in 20 ml. of ethanol and 5 ml. of water, containing 1 g. of potassium hydroxide, is allowed to stand at room temperature overnight. The solution is diluted with water to about 40 ml. and warmed gently, whereupon crystals are formed. The mixture is cooled, diluted with water to 100 ml., filtered, and the residue is collected and washed with water. An ethanol suspension of this solid material is made acidic with hydrochloric acid (1.1) and then diluted with water. The insoluble material is filtered off, an excess of aqueous ammonia is added to the filtrate, the resulting precipitate is removed and dissolved in a small amount of ethanol. This solution is acidified with hydrochloric acid (1:1), the insoluble material is filtered off, the filtrate is concentrated to dryness under a nitrogen atmosphere until a solid material separates. Ether is added and the resulting $\Delta^5$-20$\beta$-amino-3$\beta$-hydroxy-pregnene 3-rhamnoside is collected and washed with ether, M.P. 275–285°; yield: 0.23 g.

Additional compounds, which may be prepared according to the previously described procedure by choosing the appropriate reactants and reagents, are, for example, $\Delta^5$-20$\alpha$-amino-3$\beta$-hydroxy-pregnene 3-riboside,
$\Delta^5$-20$\alpha$-amino-3$\beta$-hydroxy-pregnene 3-galactoside,
$\Delta^5$-20$\alpha$-amino-3$\beta$-hydroxy-pregnene 3-mannoside,
$\Delta^5$-20$\alpha$-amino-3$\beta$-hydroxy-pregnene 3-maltoside,
$\Delta^5$-20$\beta$-amino-3$\beta$-hydroxy-pregnene 3-riboside,
$\Delta^5$-20$\beta$-amino-3$\beta$-hydroxy-pregnene 3-galactoside,
$\Delta^5$-20$\beta$-amino-3$\beta$-hydroxy-pregnene 3-mannoside,
$\Delta^5$-20$\beta$-amino-3$\beta$-hydroxy-pregnene 3-maltoside,
$\Delta^5$-20$\alpha$-amino-3$\beta$,21-dihydroxy-pregnene 3-riboside,
$\Delta^5$-20$\alpha$-amino-3$\beta$,21-dihydroxy-pegnene 3-galactoside,
$\Delta^5$-20$\alpha$-amino-3$\beta$,21-dihydroxy-pregnene 3-mannoside,
$\Delta^5$-20$\alpha$-amino-3$\beta$,21-dihydroxy-pregnene 3-maltoside,
$\Delta^5$-20$\alpha$-amino-3$\beta$-hydroxy-pregnene 3-$\alpha$-D-glucoside,
$\Delta^5$-20$\beta$-amino-3$\beta$-hydroxy-pregnene 3-$\alpha$-D-glucoside,
$\Delta^5$-20$\alpha$-amino-3$\beta$-hydroxy-19-nor-pregnene 3-$\beta$-D-glucoside,
$\Delta^5$-20$\beta$-amino-3$\beta$-hydroxy-19-nor-pregnene 3-$\beta$-D-glucoside,
$\Delta^5$-20$\alpha$-amino-3$\alpha$-hydroxy-pregnene 3-$\beta$-D-glucoside, and the like.

The compounds of the present invention may also be prepared by other procedures, for example, by introducing a double bond into the corresponding 20-amino-3-hydroxy-pregnane 3-glycosides, which may be achieved, for example, by bromination and removal of hydrogen bromide according to known procedures.

Furthermore, a free hydroxyl group present in the final product may be acylated according to known methods, such as treatment with an acid anhydride or an acid halide, e.g. chloride or bromide, in the presence of appropriate solvents and/or bases to absorb generated acid. The free amino group may be temporarily protected during such an acylation reaction, for example, by an easily removable radical, e.g. trifluoroacetyl, which may be taken off by mild hydrolysis.

What is claimed is:
1. A member of the group consisting of 3-glycosides of $\Delta^5$-20-amino-3-hydroxy-pregnene compounds of the formula:

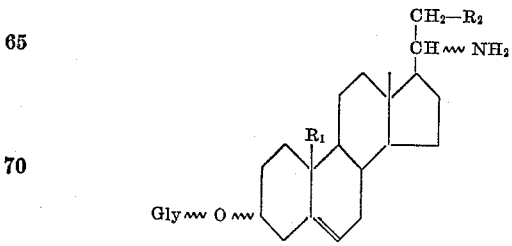

in which $R_1$ represents a member of the group consisting of hydrogen and methyl, $R_2$ stands for a member of the group consisting of hydrogen, hydroxyl and hydroxyl esterified with an organic carboxylic acid containing from one to twelve carbon atoms, and Gly represents the radical of a member of the group consisting of monosaccharides, and disaccharides, with the proviso that Gly represents α-D-glycosyl, whenever $R_1$ stands for methyl, $R_2$ for hydrogen, the amino group in the 20-position has the α-configuration and the oxido group in the 3-position has the β-configuration, the glycosylated hydroxyl group has the α-configuration, and salts of such compounds.

2. 3-glycosides of $\Delta^5$-20β-amino-3-hydroxy-pregnene with monosaccharides.

3. 3-glycosides of $\Delta^5$-20β-amino-3β-hydroxy-pregnene with aldohexoses.

4. Compounds according to claim 3, wherein D-glucose represents the aldohexose.

5. $\Delta^5$-20β-amino-3β-hydroxy-pregnene 3-β-D-glucoside.

6. $\Delta^5$-20β-amino-3β-hydroxy-pregnene 3-arabinoside.

7. $\Delta^5$-20β-amino-3β-hydroxy-pregnene 3-rhamnoside.

8. $\Delta^5$-20α-amino-3β,21-dihydroxy-pregnene 3-β-D-glucoside.

References Cited in the file of this patent

UNITED STATES PATENTS

| | | |
|---|---|---|
| 2,270,379 | Miescher | Jan. 20, 1942 |
| 2,455,214 | Bennekou | Nov. 30, 1948 |

OTHER REFERENCES

Gaunt et al.: Endocrinology, vol. 54 (1954), pp. 272–283.

Korte et al.: Naturforsch, vol. 10B (1955), pp. 499–503.